(12) United States Patent
Canal Vila

(10) Patent No.: US 12,523,198 B2
(45) Date of Patent: Jan. 13, 2026

(54) METHODS AND DEVICES FOR VIBRATION MITIGATION ON WIND TURBINES

(71) Applicant: General Electric Renovables Espana, S.L., Barcelona (ES)

(72) Inventor: Marc Canal Vila, Barcelona (ES)

(73) Assignee: GE Vernova Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/698,083

(22) PCT Filed: Oct. 4, 2021

(86) PCT No.: PCT/EP2021/077295
§ 371 (c)(1),
(2) Date: Apr. 3, 2024

(87) PCT Pub. No.: WO2023/057039
PCT Pub. Date: Apr. 13, 2023

(65) Prior Publication Data
US 2025/0237195 A1    Jul. 24, 2025

(51) Int. Cl.
*F03D 80/50*    (2016.01)
(52) U.S. Cl.
CPC ........ *F03D 80/50* (2016.05); *F05B 2260/964* (2013.01)
(58) Field of Classification Search
CPC ............................ F03D 80/50; F05B 2260/964
See application file for complete search history.

(56) References Cited

U.S. PATENT DOCUMENTS

| | | | |
|---|---|---|---|
| 2016/0023761 A1* | 1/2016 | McNally | G05D 1/0094 701/3 |
| 2017/0002797 A1* | 1/2017 | Chen | F03D 7/0296 |
| 2020/0109698 A1* | 4/2020 | Pedersen | G05D 1/104 |
| 2020/0116128 A1* | 4/2020 | Pedersen | F03D 7/0296 |
| 2020/0171552 A1* | 6/2020 | Hamamura | B25J 11/0065 |
| 2023/0323864 A1* | 10/2023 | Tobin | F03D 80/301 416/230 |

* cited by examiner

*Primary Examiner* — Sean Gugger
(74) *Attorney, Agent, or Firm* — Dority & Manning, P.A.

(57) ABSTRACT

The present disclosure relates to methods for installing and uninstalling devices for reducing vibrations in wind turbines and to such devices. More particularly, the present disclosure relates to methods for installing and uninstalling devices for reducing vortex induced vibrations and stall induced vibrations when the wind turbine is parked, especially during wind turbine installation and/or maintenance, and to such devices. A method for installing a vibration mitigating device for mitigating wind turbine vibrations on a wind turbine blade of a parked wind turbine is provided. The method comprises moving the vibration mitigating device at least partially around the wind turbine blade using one or more drones; and securing the vibration mitigating device to the wind turbine. In some examples, the vibration mitigating device may be carried to the wind turbine blade using the one or more drones.

30 Claims, 8 Drawing Sheets

METHODS AND DEVICES FOR VIBRATION MITIGATION ON WIND TURBINES

RELATED APPLICATION

The present application claims priority to PCT Application Serial Number PCT/EP2021/077295, filed Oct. 4, 2021, which is incorporated by reference herein in its entirety.

The present disclosure relates to methods for installing and uninstalling devices for reducing vibrations in wind turbines and to such devices. More particularly, the present disclosure relates to methods for installing and uninstalling devices for reducing vortex induced vibrations and stall induced vibrations when the wind turbine is parked, especially during wind turbine installation and/or maintenance, and to such devices.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. That makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, increase the need of repairs and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, a method for installing a vibration mitigating device for mitigating wind turbine vibrations on a wind turbine blade of a parked wind turbine is provided. The method comprises moving the vibration mitigating device at least partially around the wind turbine blade using one or more drones. The method further comprises securing the vibration mitigating device to the wind turbine.

According to this aspect, one or more drones help to install a device for mitigating wind turbine vibrations on a wind turbine blade of a parked wind turbine. Once the vibration mitigating device is in a desired position with respect to the blade, e.g. after having been moved, optionally extended, around the blade, the vibration mitigating device is then secured to the wind turbine. The device may therefore mitigate vibrations such as VIVs and/or SIVs.

Using at least one drone for mounting a device for mitigating wind turbine vibrations may provide several advantages with respect to other methods of installation. For example, rotating the rotor to place a blade in a specific predetermined position enabling the device to be mounted may be avoided. Therefore, even if the rotor is damaged or unbalanced, a blade may be protected from vibrations by using one or more drones for the installation of the device. Pitching the blade, again for placing it in a more suitable position, may also be avoided. Accordingly, even if the pitch system is blocked or damaged, a vibration mitigating device may still be mounted to the blade. As none of these actions may be necessary, the device may be installed faster and in an easier way. Also, the use of one or more lifting devices may be dispensed with. This may reduce the time needed for mounting the vibration mitigating device. In addition, installing a vibration mitigating device using a drone can take place at any moment, e.g. during erection and commissioning of a wind turbine, but also during the normal life of a wind turbine in case of prolonged maintenance or disconnection from the grid.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Herein it may be understood that a wind turbine is in operation when its rotor is rotating at a speed high enough to produce energy and the generator of the wind turbine is producing electrical power.

In a further aspect of the disclosure, a method for removing a vibration mitigating device for mitigating wind turbine vibrations arranged on a wind turbine blade of a parked wind turbine is provided. The method comprises carrying the vibration mitigating device away from the blade using one or more drones; and carrying the vibration mitigating device to a site using the drones.

The advantages mentioned above likewise apply to the uninstallation method.

Still in a further aspect of the disclosure, a method for mitigating vibrations of a parked wind turbine is provided. The method comprises carrying a device for mitigating wind turbine vibrations in a retracted configuration to a wind turbine blade using a drone; sliding the device around the wind turbine blade using the drone; extending the device towards a blade root using the drone; and securing the device to a nacelle or hub of the wind turbine.

DETAILED DESCRIPTION OF EXAMPLES

Figure 1:
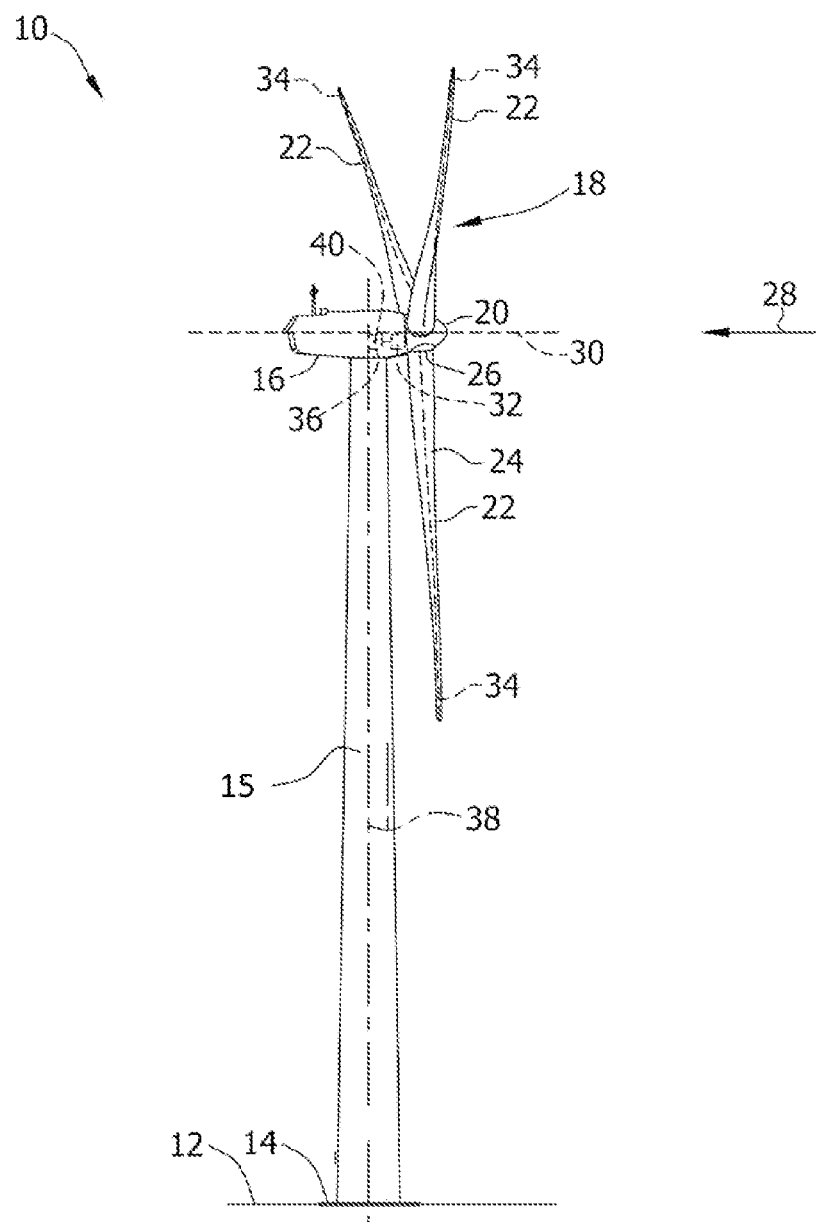
FIG. 1 illustrates a perspective view of one example of a wind turbine.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20.

In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
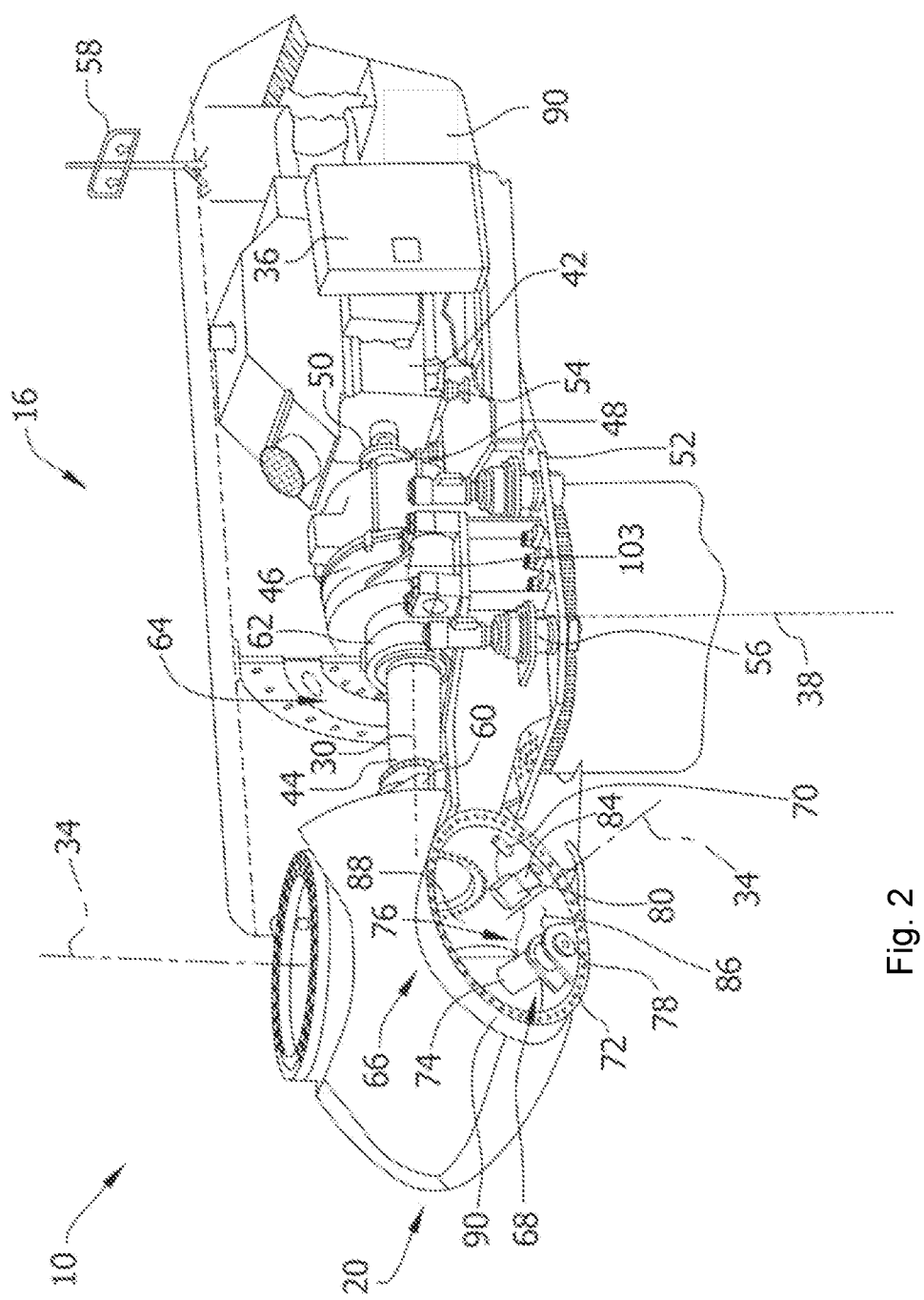
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
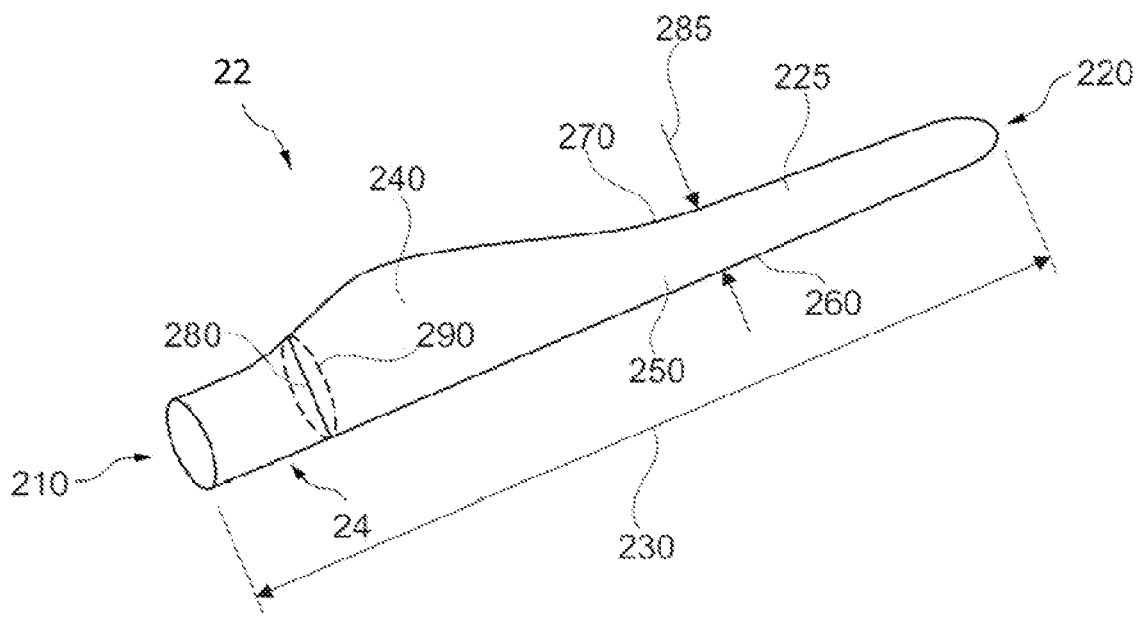
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub 20 of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 22 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind turbine blades and the wind turbine. The wind turbine rotor may or may not be locked in these situations.

At least two types of oscillations or vibrations may happen particularly when the turbine is parked. The first ones are so-called vortex induced vibrations (VIVs), and these can arise when an angle of attack for a blade or airfoil portion is around 90 degrees. Vortex shedding may contribute to enhance the wind turbine blade oscillation. The second type of oscillations are stall induced vibrations (SIVs) which can arise when the angle of attack is close to stall angles (e.g. 15 degrees-30 degrees). The angle of attack may be understood as a geometrical angle between a flow direction of the wind and the chord of a rotor blade or a local chord of a rotor blade section.

Different devices may be attached to a wind turbine blade 22 for reducing vibrations when the wind turbine 10 is parked. The devices may be or may include one or more air flow modifying elements. An airflow modifying element may be understood as an element configured to significantly disturb the air flow, e.g. its magnitude and/or its direction, around a wind turbine blade 22. In particular, an airflow modifying element may be configured to make the airflow more turbulent and/or disturb at least an airflow advancing in a spanwise direction of the wind turbine blade. In some examples, air flow modifying elements may be or may comprise one or more of protrusions, recesses and through-holes. Airflow modifying elements may alternatively or additionally be configured to increase drag in oscillation. The performance of the wind turbine may not be negatively affected as the device(s) may be removed before the wind turbine starts normal operation. One or more devices 360 may be particularly useful during installation and/or commissioning of a wind turbine. It may be also useful if the wind turbine is stopped, e.g. for maintenance.

Figure 4A:
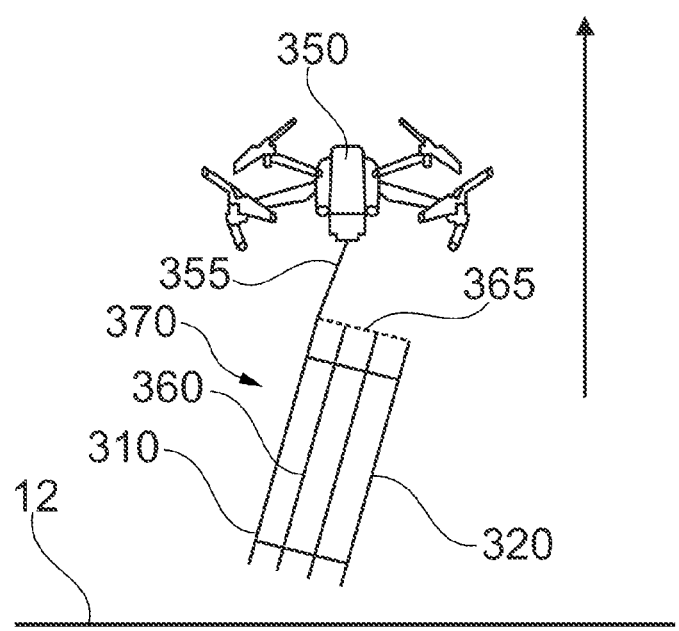
FIGS. 4A-4D schematically illustrate some steps of an example of a method for installing a device for mitigating vibrations on a wind turbine blade.
Figure 4B:
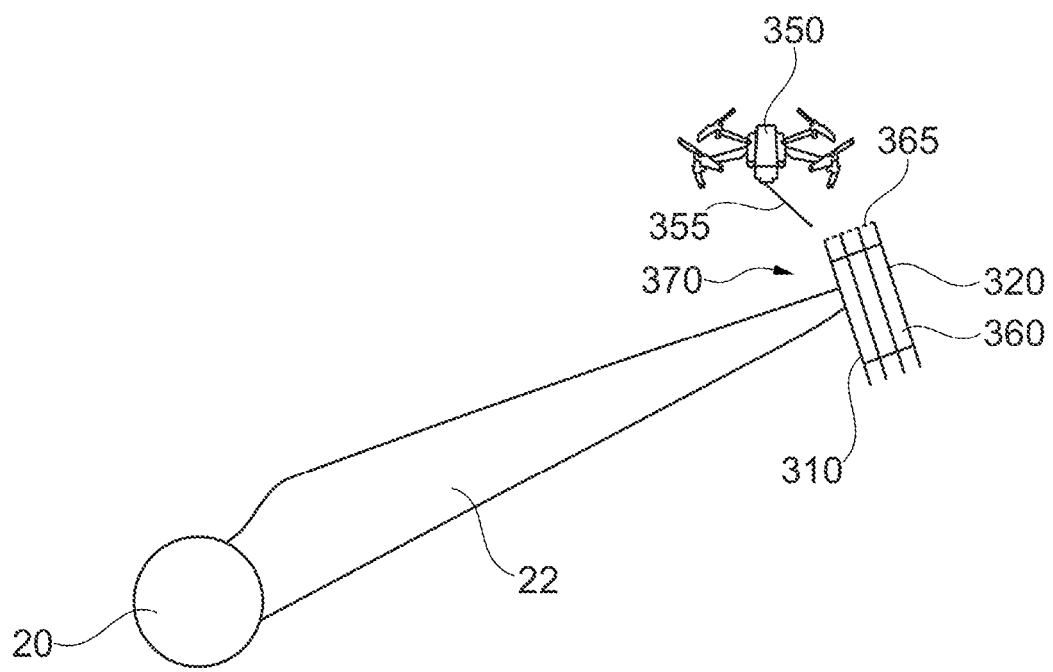
Figure 4C:
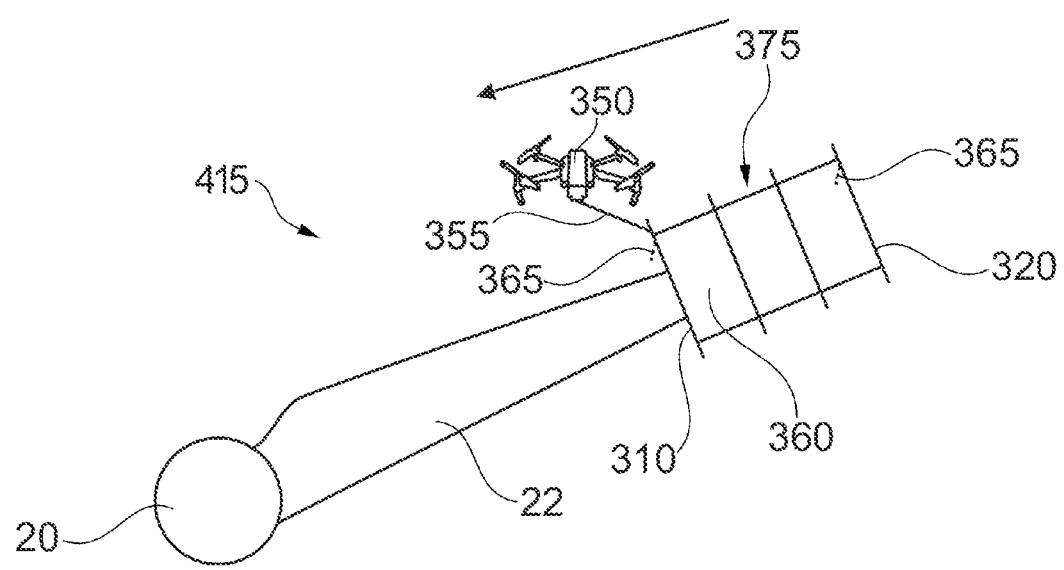
Figure 4D:
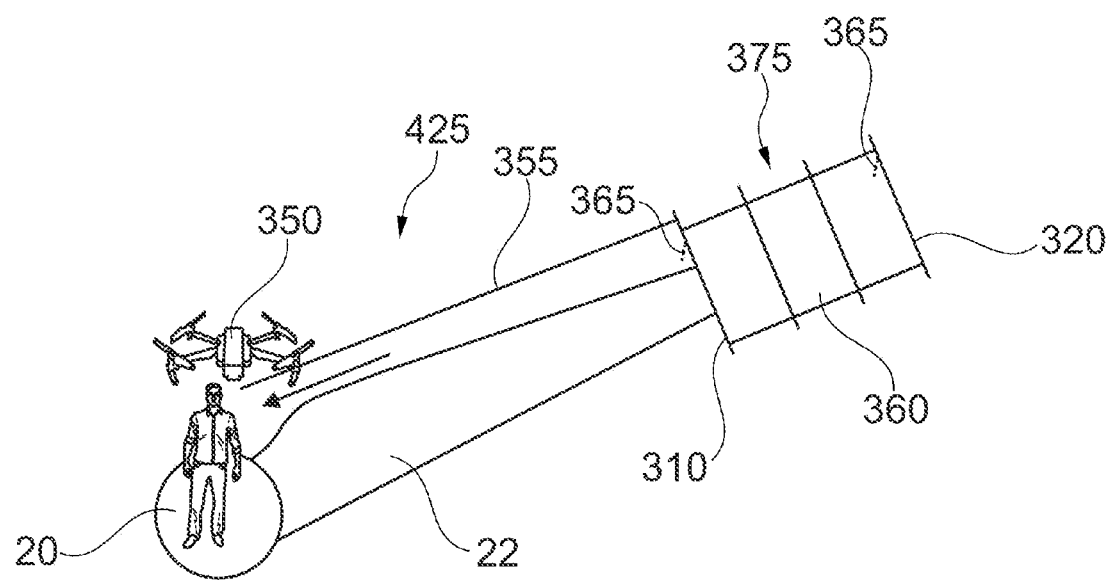

A method for installing a first vibration mitigating device 360 for mitigating wind turbine vibrations on a wind turbine blade 22 of a parked wind turbine 10 is provided. The method comprises: moving 415 the first vibration mitigating device 360 at least partially around the wind turbine blade 22 using one or more drones 350. The method further comprises securing 425 the device 360 to the wind turbine 10. Examples of steps 415 and 425 are schematically illustrated in FIGS. 4C and 4D, respectively. FIGS. 4A and 4B schematically illustrate optional steps of the method.

Accordingly, one or more drones 350 help to place a first device 360 for mitigating wind turbine vibrations in a suitable position around the blade 22. The first vibration mitigating device 360 is then secured to the wind turbine 10. The device on the blade is configured to mitigate vibrations such as VIVs and/or SIVs, and therefore structural stress and strain in wind turbines and damage may be avoided or at least reduced.

By using one or more drones 350 for installing the device 360 for vibration mitigation, rotating the rotor 18 for placing the blade 22 in a particular position, e.g. pointing downwards, may not be necessary, and might be avoided. Pitching the blade 22 for placing it in a more suitable orientation may also be avoided. As pitching and/or rotating the rotor may be dispensed with, a device may be mounted to the blade even if the rotor 18 is blocked or the pitch system is stuck.

Lifting devices such as cranes may be dispensed with, which may ease and accelerate the mounting/unmounting process of the vibration mitigating device 360. As the installation/uninstallation time needed may be decreased, time windows in which the wind speed is suitable, i.e. periods during which wind speed is sufficiently low, for installing/removing the devices may be better taken advantage of. Operators having to mount/unmount the device may benefit from this, as the time spent at high altitudes and/or on lifting devices may be reduced. Security of the operators may accordingly be increased.

In some examples, moving 415 the first vibration mitigating device may comprise moving the device from a blade tip 220 towards a blade root 210. In some examples, the entire device 360 may be moved towards the blade root. In other examples, only a portion of the device may be moved towards the blade root. FIG. 4C schematically illustrates how a drone 350 may move a vibration mitigating device 360 towards a blade root. In some examples, as e.g. in FIG. 4C, moving may comprise extending the vibration mitigating device 360 from a retracted configuration 370 to an extended configuration 375. The drone 350 pulls the device for extending it.

Figure 5A:
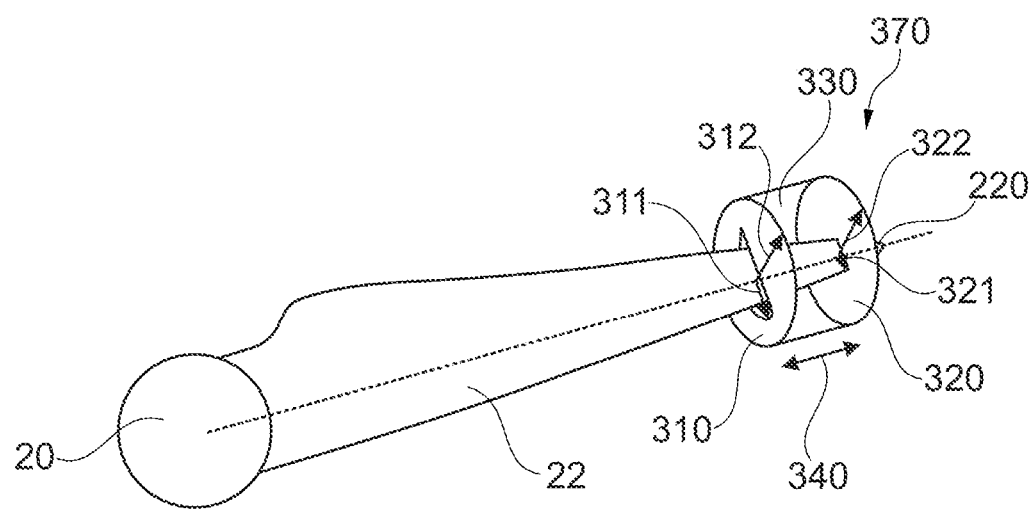
FIGS. 5A and 5B schematically illustrate an example of a device suitable to be mounted to and unmounted from a wind turbine blade by one or more drones, the device being shown in a retracted configuration in FIG. 5A and in an extended configuration in FIG. 5B.
Figure 5B:
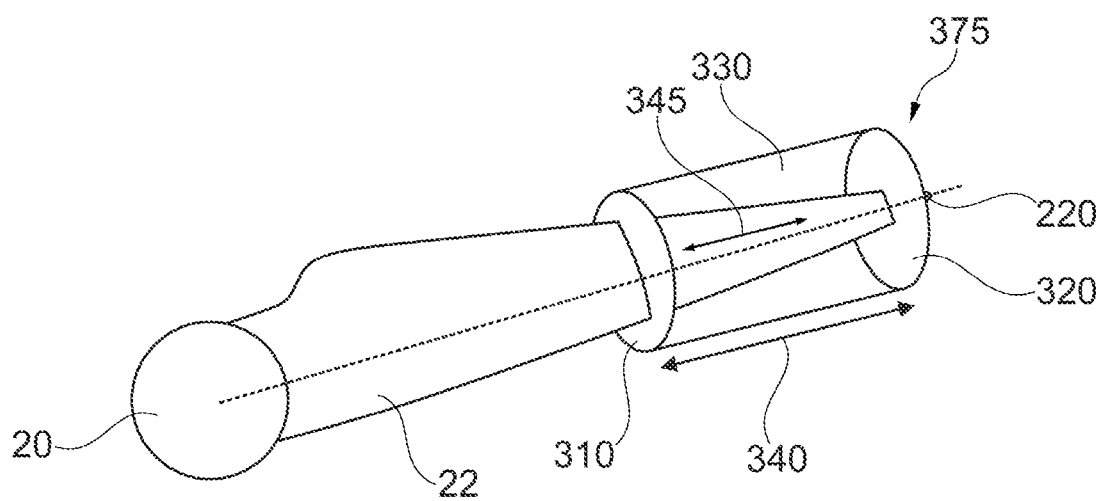

The device may have an extended configuration 375 (see FIGS. 4A, 4B and 5A) and a retracted configuration 370 (see FIGS. 4C, 4D and 5B). A length 340 of the device in the retracted configuration 370 may be smaller than a length of the device in the extended configuration 375. A device 360 may be compressed along a longitudinal direction 345 for retracting it. The vibration mitigating device 360 may be pulled along a longitudinal direction 345 for extending it. A retracted configuration as used herein may mean that the vibration mitigating device 360 has a configuration in which its dimensions (length, width and/or thickness) are smaller than in an extended configuration.

FIGS. 5A and 5B schematically show an example of a vibration mitigating device 360 which may be installed on a wind turbine blade 22 using one or more drones 350. In FIG. 5A the device 360 is in a retracted configuration 370 and in FIG. 5B the device 360 is in an extended configuration 375. In both figures the vibration mitigating device is shown arranged around the blade 22. In other examples, the device may be in an extended configuration around the blade 22. This may be the case, for example, if one or more drones 350 carry the device 360 in an extended configuration to a wind turbine blade 22. The drones 350 may arrange the device 360 around the blade 22 and move it towards a blade root 210 already in an extended configuration.

In some examples, the first vibration mitigating device may have a closed cross-section. The device may be hollow, or at least partially hollow, in some examples. The device may form or may comprise an inside channel extending from a root end 310 to a tip end 320. A root end 310 may be understood as an end of the device configured to be closer to a blade root 210 when mounted around the blade. A tip end 320 may be understood as an end of the device configured to be closer to a blade tip 220 when arranged around the blade 22. The channel may e.g. extend along a length 340 of the vibration mitigating device. The channel may be seen as a through hole and may be referred to as air channel. The device may be oriented such that the inside channel of the device surrounds the tip 220 of the blade 22. For instance, the device 360 of the example of FIGS. 5A and 5B is hollow and has a closed cross-section, e.g. a substantially circular or elliptical cross-sections. In other examples, the device may have an open cross-section, e.g. it may have a U-shape or C-shape cross-section. In these or other examples, the device may further comprise a sleeve (not shown) connected to the device, wherein the sleeve is configured to fit around a wind turbine blade portion. Damage to serrations of a blade 22 may be avoided or at least reduced by using a sleeve. Due to the presence of the sleeve, the vibration mitigating device would be partially hollow.

The vibration mitigating device 360 may have a certain length 340 along a longitudinal direction 345 of the device, and a cross-section may correspond to a plane substantially perpendicular to the longitudinal direction of the vibration mitigating device. The vibration mitigating device 360 may comprise a barrier 330 extending between a first longitudinal end 310 and a second longitudinal end 320 of the device. The first longitudinal end 310 of the device may be configured to be arranged closer to the blade root 210 and the second longitudinal end 320 may be configured to be arranged closer to the blade tip 220 when arranged around the blade 22. The first longitudinal end may be referred to as root end, and the second longitudinal end may be referred to as tip end. In some examples, a device 360 may have a substantially cylindrical, conical or truncated-conical shape. In the example of FIGS. 5A and 5B, the device 360 has a cylindrical shape.

Herein, a barrier 330 may be understood as an element configured to modify the air flow before it reaches a wind turbine blade surface. An air flow modifying element may be understood as an element configured to significantly disturb the air flow, e.g. its magnitude and/or its direction, around a wind turbine blade 22. In particular, an airflow modifying element may be configured to make the airflow more turbulent and/or disturb at least an airflow advancing in a spanwise direction of the wind turbine blade 22.

A barrier may in some examples be flexible for allowing the device 360 to be extendable and retractable. In these or other examples, a thickness of the barrier 330 may be negligible or very small in comparison to its length and its width. A barrier may in some examples be a textile-based barrier, e.g. a tarp, a weave, a cloth or a net. A barrier may in some examples have four edges. When fully extended on a flat surface, e.g. on the ground, a barrier 330 may have a rectangular or trapezoid shape.

In some examples, the first 310 and second 320 longitudinal ends may be configured to provide a gap between the vibration mitigating device 360 and the wind turbine blade 22, e.g. between the barrier 330 and the blade 22. I.e., the barrier 330 may be maintained separated from the blade 22. In these or other examples, the barrier 330 and the longitudinal ends 310, 320 may form a sleeve or base. The sleeve or base may include air flow modifying elements such as one or more of: recesses, protrusions and openings.

In some examples, the barrier 330 may be porous or permeable, e.g. it may be a net. A porous barrier may be made of a sponge-like material in other examples. A porous or permeable barrier may be understood throughout this disclosure as a barrier comprising a plurality of holes (pores) such that air can pass through them, and therefore from one side of the barrier 330 to the other side of the barrier 330. In other examples, the barrier 330 may be non-permeable or non-porous, i.e. air would not be able to go through the barrier 330, but it would have to surround it instead.

In some examples, the first vibration mitigating device 360 may be arranged around the blade tip 220. FIG. 4B schematically illustrates an example of how a drone 350 arranges a vibration mitigating device 360 around a blade tip 220. The device 360 may be configured to this end. Once in contact with the blade 22, the device 360 may be moved, e.g. slid, towards the blade root 210. In some examples, as in the example of FIG. 4B, the first vibration mitigating device 360 may be arranged on a retracted configuration 370. In other examples, the vibration mitigating device 360 may be arranged around the blade tip 220 in an extended configuration 375.

A vibration mitigating device 360 in a retracted configuration 370 may be easier to lift and arrange around the wind turbine blade 22. The device may be provided in a retracted configuration. For example, the device may already be stored in a retracted configuration in a warehouse, it may be transported to a wind turbine site in the retracted configuration, and it may be joined to the drone 350 in this configuration. In some of these examples, the device 360 may be transported to an installation site separately from a blade 22, and one or more drones 350 may then carry the device 360 to a wind turbine blade of a parked wind turbine 10, e.g. from the ground, or a nacelle or a hub. In some other examples, the device 360 may be mounted to a blade 22, and the blade 22 and the device 360 may be transported together to an installation site. Once the blade 22 with the device 360 is attached to a wind turbine 10, one or more drones 350 may extend the vibration mitigating device 360 towards a blade root 210. One or more drones 350 may also help to keep the device 360 connected to the blade 22 when lifting the blade 22 to attach it to the hub 20. Still in other examples, a device 360 may be arranged around an installed blade 22 by other means different from one or more drones 350, and the drones may help to place it in a desired position, e.g. by pulling and/or extending it.

In other examples, the vibration mitigating device 360 may be provided in an extended configuration 375 and it may be caused to adopt a retracted configuration 370 before it is connected to a drone 350. The device may be joined to the drone by a carrying rope 355. In some examples, more than one rope may be used. A rope may be any suitable rope, cable, string, chain or similar elongated object suitable for joining the drone 350 and the vibration mitigating device 360, and carrying the device. The device 360 may then be carried by the drone 350, e.g. from the ground, a nacelle or a hub. In the example of FIG. 4A, a drone 350 lifts a retracted device from the ground. In the example of FIG. 4B, the drone 350 arranges the first vibration mitigating device 360 in a retracted configuration 370 around the first wind turbine blade 22.

In some examples, the device may be maintained in the retracted configuration 370 by a breakable connector 365, see e.g. FIGS. 4A and 4C. A breakable connector 365 may be understood as a connector attachable to two portions of the device, e.g. to a root and a tip end of the device 310, 320, which is configured to break when it is pulled with a force above a predetermined threshold. The breakable connector 365 may comprise a fusible portion or a weakened portion configured to break at a specific force level.

Accordingly, the breakable connector 365 may be attached to a root end 310 and tip end 320 of the vibration mitigating device 360 and keep the device in the retracted position 370. If the device is stored in the retracted position, the device may already include the breakable connector 365. In other examples, e.g. if the vibration mitigating device is retracted on a wind turbine site, the breakable connector may be attached to the device at this stage. A device 360 lifted in the retracted position, e.g. from the ground, the nacelle or the hub, may be easier to handle and carry. The risk of damaging the device e.g. due to wind gusts may also be reduced. In some examples, a length 340 of a device may be above 10 m (when fully extended), and therefore compacting such a device may facilitate carrying it and arranging it around the blade 22, e.g. around the blade tip 220.

A breakable connector 365 may be made of one or more elements. In some examples, a breakable connector may be an elastic rope or string. The elastic rope may be configured to break after it has been pulled with a force above a predetermined force threshold. In some other examples, a breakable connector may comprise two ropes or strings joined by a breakable piece. The free end of one of the ropes may be attached to a root end 310 of the device, and the free end of the other rope may be attached to the tip end 320 of the device. The breakable piece may break after it has been pulled with a force exceeding a predetermined force threshold.

In some examples, more than one breakable connector 365 may be attached to the vibration mitigating device 360. For instance, two, three or more breakable connectors may be attached to the device, e.g. each connector may be attached to the two longitudinal ends 310, 320 of the device. This may help to ensure that the device is kept in the retracted state 370 while carrying the device to the blade and arranging the device around the blade tip 220.

In some examples, moving, in particular extending, the first vibration mitigating device 360 around the first blade 22 may comprise breaking the breakable connector 365 by pulling the device towards the blade root 210. The device 360 may have a root end 310 and a tip end 320. The root and the tip ends may have a substantially circular or elliptical cross-section in some examples. Each end 310, 320 may have, in cross-section, an internal radius 311, 321 and an external 312, 322 radius. An internal radius 321 of the tip end 320, which is configured to be closer to the tip 220 than the root end 310, may be smaller than an internal radius 311 of the root end 310.

For example, in FIGS. 5A and 5B, an internal diameter 321 of the second longitudinal end 320 is smaller than an internal diameter 311 of the first longitudinal end 310. I.e., the second longitudinal end 320 has, in cross-section, an internal perimeter that is smaller than an internal perimeter of the first longitudinal end 310. A radius of the first longitudinal end 310 and of the second longitudinal end 320 may be measured in a same direction.

The drone 350 may orient the device 360 such that the root end 310, which may have an internal radius 311 larger than an internal radius 312 of the tip end 320, surrounds the wind turbine blade tip 220 before the tip end 320. It may then happen that an inside surface of the tip end 320 touches a blade surface, and the tip end of the vibration mitigating device gets stuck and cannot keep moving towards the root 210. Depending on whether the tip end 320 is a closed end or an opened end, this end may get stuck with the blade tip 220, e.g. if the device is substantially conical, or this end may get stuck around a tip region, but after having passed the blade tip 220.

The drone 350 may keep pulling the vibration mitigating device 360 towards the root 210, but as the tip end is not able to continue sliding, the force exerted on the device may increase due to the retaining action of the breakable connector 365 (see FIG. 4B). The pulling force may become high enough to cause the breakable connector 365 to break. I.e., breaking the breakable connector may comprise pulling the device 360, using at least one drone 350, with a force exceeding a predetermined force threshold. This may free the root end 310, and the root end may be further slid towards the blade root 210 by one or more drones 350 (see FIG. 4C), e.g. until it is completely extended. The breakable connector 365 is configured to break when it is pulled with a force above a predetermined threshold.

The device 360 may be moved, e.g. pulled or slid, towards the blade root 210 until an internal surface of the root end 310 touches a surface of the blade 22 and it gets stuck, and therefore cannot keep its movement towards the root 210. In other examples, the device may be moved towards the blade root 210 until the device 360 has achieved a maximum length 340 and therefore it is not possible to keep extending the device. Still in other examples, both conditions may occur at a substantially same time. For example, the device 360 may be configured such that, when its root end, e.g. the first longitudinal end, comes into contact against the blade surface and gets stuck, the device has also achieved its maximum length and is therefore totally extended.

With respect to the external radii 312, 322 of the root 310 and tip 320 ends, they may be substantially equal, or one of them may be larger than the other. For example, in FIGS. 5A and 5B, the external radii 312, 322 of both longitudinal ends 310, 320 are substantially the same. The device 360 may have a substantially cylindrical shape in these examples. In other examples, an external radius 322 of the tip end 320 may be smaller than an external radius 312 of the root end 310. The vibration mitigating device 360 may have a substantially truncated conical shape in these examples. The root 310 and tip 320 ends of the device 360 may be inflatable in some examples. If the barrier 330 and the tip 320 and root 320 ends form a sleeve or base, a thickness of the device 360 along its length 340 may be substantially constant.

A drone 350 and the vibration mitigating device 360 may be connected by a carrying rope 355. The carrying rope 355 may be attached at or near a root end 310 of the device, e.g.

the first longitudinal end 310. Therefore, the drone 350 may pull the device towards the blade root 210 by pulling the carrying rope 355, which pulls the device 360.

Securing 425 the vibration mitigating device may comprise carrying the carrying rope 355 to the nacelle 16 or to the hub 20. An operator may take the rope 355 and attach it to an anchoring point of the nacelle or the hub. In some examples, a carabiner may be used. Accordingly, the device 360 for mitigating vibrations may disturb air flowing around or through it until it needs to be removed from the blade 22, e.g. when the wind turbine 10 is ready to start or to resume operation.

In some examples, carrying the carrying rope 355 to the nacelle 16 or the hub 20 may further comprise exceeding a force threshold for extending the carrying rope. In some examples, extending the carrying rope may comprise unwinding the carrying rope. In some of these examples, the drone 350 or the vibration mitigating device 360 may be provided with a winch. A winch may comprise a drum or bobbin around which the carrying rope may be wound. The winch may further comprise a brake configured to prevent the drum or bobbin from spinning until a predetermined force threshold has been overcome or until the brake is remotely deactivated. Therefore, until a force above that threshold is applied to the carrying rope 355, the portion of the carrying rope wound around the bobbin may be kept around the bobbin in some examples. When a force above the threshold is exceeded, the brake may not be able to retain the wound rope and therefore the rope 355 may be unwound. In other examples, the brake of the winch may be remotely deactivated, e.g. by an operator up tower, and the rope may be unwound from the bobbin when the drone 350 pulls the rope. A winch may be used to regulate the amount of carrying rope, and therefore the distance, between the drone and the device.

For example, a winch may be attached to the drone 350. In the examples where one or more drones carry the device 360 to a blade 22, the force threshold of the winch may be set such that a certain distance is kept, and not increased, between the drone 350 and the vibration mitigating device 360 when the drone carries the device to the blade. The force threshold of the winch may further be set such that the distance between the drone and the device is maintained, and not increased, when the drone pulls the carrying rope 355 and the breakable connector 365 breaks. The force threshold of the winch may therefore be higher than the force threshold of the breakable connector and higher than a force expected on the rope when carrying the device to the blade. The latter force may take into account the weight of the device and an expected force exerted by the wind, e.g. possible wind gusts.

Accordingly, once the breakable connector 365 breaks, the drone 350 may keep pulling the carrying rope 355, keep extending the vibration mitigating device 360, and also exceeding the force threshold of the winch. The brake may accordingly not able to retain the wound portion of the carrying rope and it may start to unwound. The drone 350 may move further towards the hub 20 or the nacelle 16 so that an operator can pick the rope 355 and attach it to the anchoring point.

In this way, a drone 350 may carry the vibration mitigating device to a wind turbine blade 22 keeping a relatively short distance with the device 360, which may allow for a more stabilized and controlled trip, and the drone may increase the amount of carrying rope 355 for carrying the carrying rope to the nacelle or hub. The above explanation may also apply if the winch is attached to the vibration mitigating device, e.g. to the a root end 310 of the device or to a portion of the barrier 330 of the device adjacent or close to the root end.

In other examples, extending the carrying rope 355 may include snapping or tearing attached portions of the carrying rope. For instance, the rope may comprise one or more longitudinal regions in which it is bended and attached, e.g. stitched, to itself. When a force above a predetermined force threshold is exerted, the attachment may break. The portions of the rope which were previously bended may now be free to extend, thereby increasing the length of the rope. The attachment between bended portions of the carrying rope may be configured such that a substantially same distance may be kept at least while carrying the device to a wind turbine blade and until the breakable connector 365 has broken.

Still in other examples, the carrying rope 355 may have an elasticity such that when a force above a predetermined force threshold is exerted on the rope, the carrying rope stretches and the drone 350 may carry it to the hub 20 or the nacelle 16. The elasticity of the carrying rope may be such that the rope maintains a substantially same length while carrying the vibration mitigating device 360 to a wind turbine blade 22 and until the breakable connector 365 has broken.

If more than one drone 350 is used to perform the method, a second drone may be connected to the root end 310 or to a portion of the barrier 330 near the root end 310 via a second carrying rope. Additionally or alternatively, one or more additional drones may be connected to the tip end 320 via one or more carrying ropes. Using more than one drone may help to stabilize the device 360 in the air and facilitate carrying it and arranging it around the blade 22.

In some examples, the method may further comprise installing a second device 360 for mitigating wind turbine vibrations on a second wind turbine blade 22 using one or more additional drones 350. A first time period for installing the first vibration mitigating device may at least partially overlap with a second time period for installing the second vibration mitigating device. I.e., the first and second device (and further devices if present, e.g. a third device), may be installed at a substantially same time or at least at partially overlapping times. Installing vibration mitigating devices 360 in several blades 22 simultaneously, or at least at partially overlapping periods of time, may accelerate the installation. For example, one vibration mitigating device 360 may be installed per blade using at least one drone 350 for carrying each of the devices.

According to a further aspect, a method for removing a first vibration mitigating device 360 for mitigating wind turbine vibrations arranged on a first wind turbine blade 22 of a parked wind turbine is provided. This method may be performed on its own, or it may be performed after the installation method previously described. A device 360 as described previously may be a suitable device for being unmounted by this method. An example of the method is schematically illustrated in FIGS. 6A-6C.

Figure 6A:
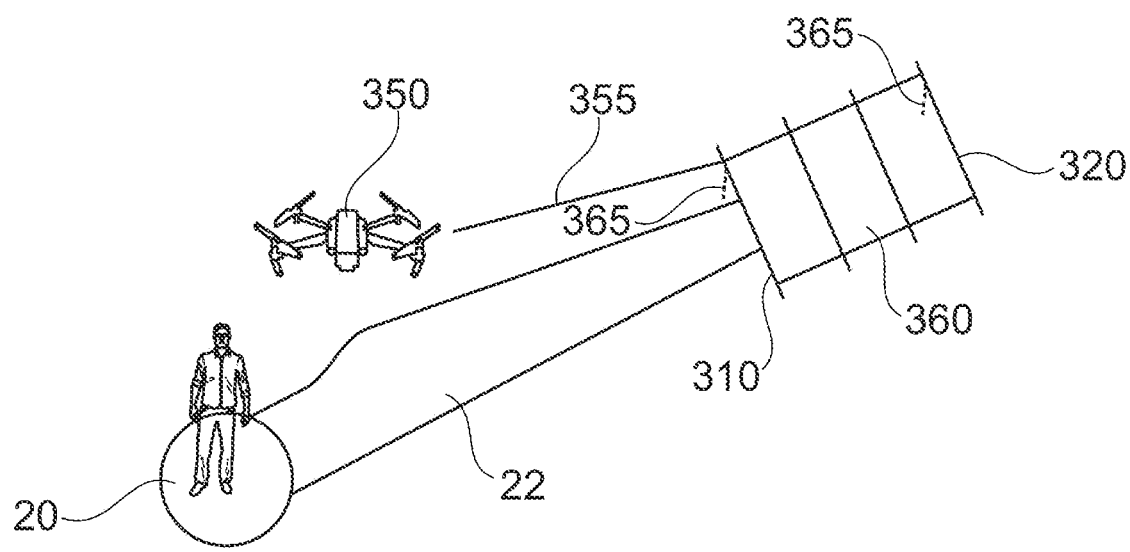
FIGS. 6A-6C schematically illustrate some steps of an example of a method for uninstalling a device for mitigating vibrations from a wind turbine blade.
Figure 6B:
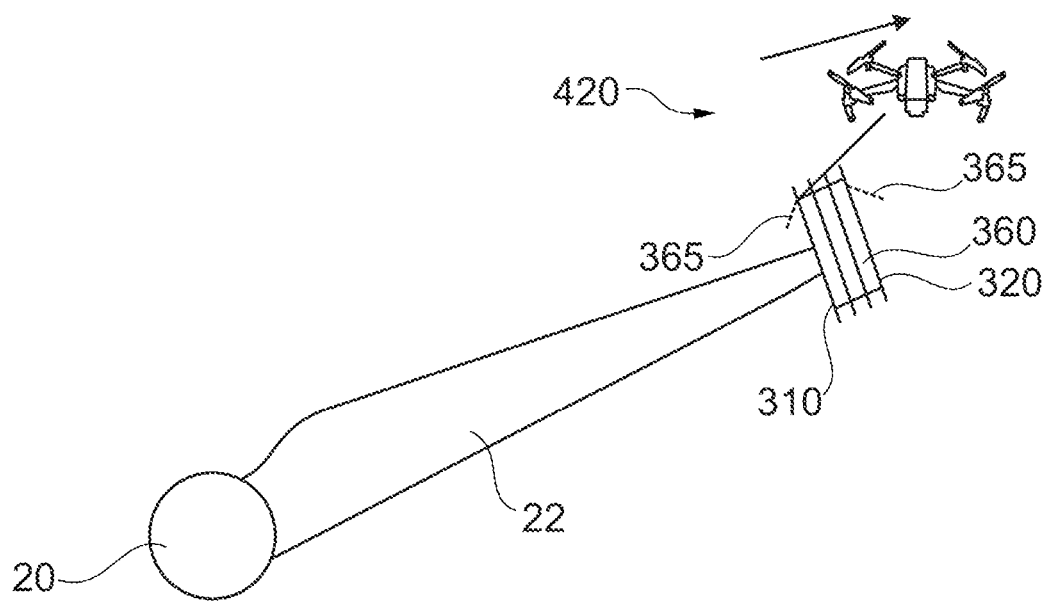

The method comprises carrying the first vibration mitigating device 360 away from the first blade 22 using one or more drones 350 (see FIG. 6B). In some examples, a vibration mitigating device may be pulled, as schematically shown with reference sign 420, towards the blade tip 220. Therefore, the device may be moved, e.g. slid, towards the blade tip.

The method may further comprise releasing the first vibration mitigating device 360 (see FIG. 6A). The device may be detached from the nacelle 16 or the hub 20 in some examples, e.g. from an anchoring point therein, for releasing the device. For example, if a carrying rope 355 joined to the device 360, e.g. at or near a root end 310 of the device, is attached to an anchor point in the nacelle or the hub, the carrying rope may be unfastened by an operator. A drone 350 may be then attached to the carrying rope 355 by the operator.

Figure 6C:
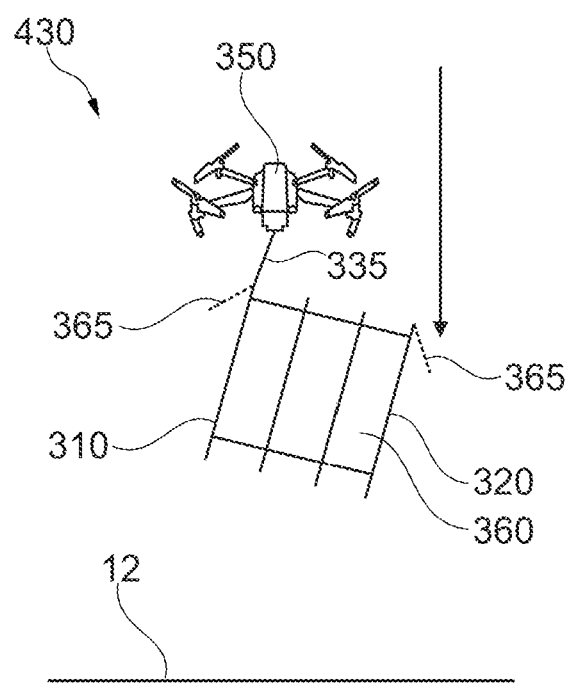

The method further comprises carrying 430 the vibration mitigating device 360 to a site using the drones 350 (see FIG. 6C). Once the device no longer surrounds the wind turbine blade 22, the one or more drones 350 may carry the device to the collection site, e.g. to the ground 12, the nacelle or the hub.

A distance between the drone 350 and the vibration mitigating device 360 may be varied. For example, before carrying the device 360 to a collection site, optionally also before carrying the device away from the blade, a length of a carrying rope portion extending between the drone 350 and the device 360 may be reduced. In some examples, a winch attached to the drone 350 or to the device 360 may be remotely activated for winding rope around a bobbin of the winch. The amount of rope extending between the drone and the device may therefore be reduced. Afterwards, the drone 350 may carry (e.g. pull) the device towards a blade tip 220. In other examples, this may be performed once the device has been moved towards the blade tip 220 but before it loses contact with the blade. By reducing an amount of carrying rope between the one or more drones and the first vibration mitigating device 360, more control and stabilization may be obtained before carrying the vibration mitigating device to a site for collecting the device 360.

In some examples, if one or more additional carrying ropes 350 are attached to the hub or nacelle, a drone may be attached to each of the ropes. An end of the rope connected to the vibration mitigating device 360 may be attached at or near a root end 310 of the device or at or near a tip end 320 of the device.

The method may further comprise removing a second vibration mitigating device 360 for mitigating wind turbine vibrations from a second wind turbine blade using one or more additional drones. A first time period for removing the first device may at least partially overlap with a second period for removing the second device. For example, a vibration mitigating device mounted to each of the blades 22 of a wind turbine 10 may be removed at a substantially, or at least at a partially overlapping, time. One or more drones 350 may be used to unmount each of the vibration mitigating devices from each blade 22.

Figure 7:
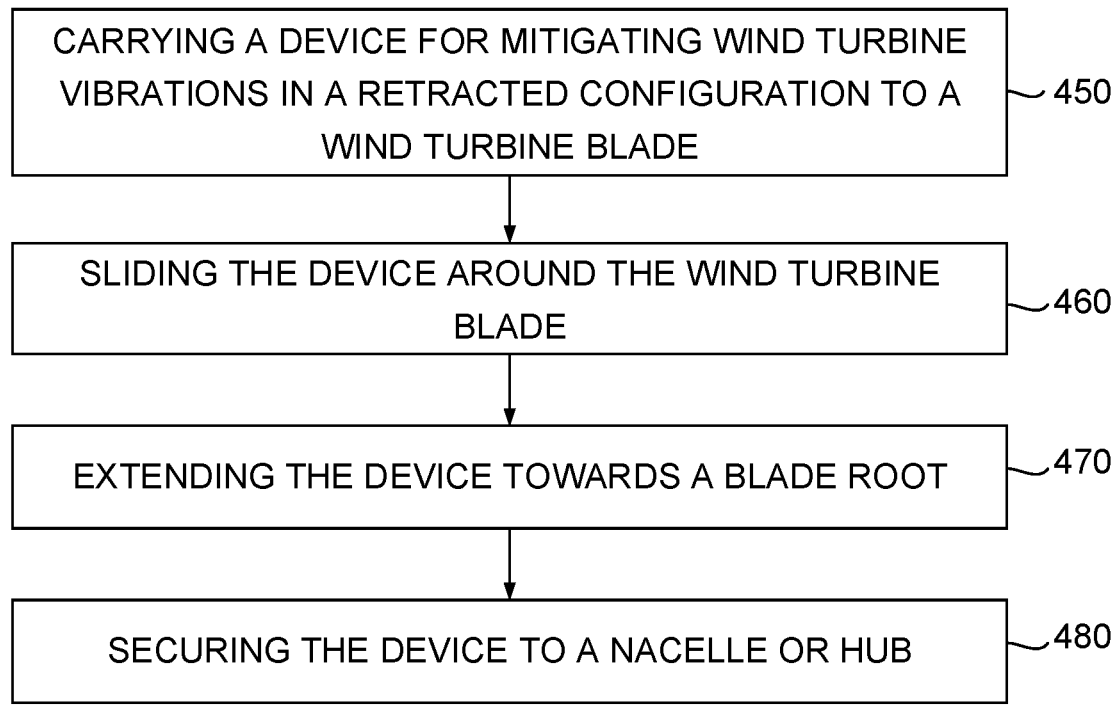
FIG. 7 illustrates a flow chart of an example of a method for mitigating vibrations of a parked wind turbine.

In a further aspect, a method for mitigating vibrations of a parked wind turbine 10 is provided. Explanations and details from the two above methods can be applied to and mixed with the current method. The method is schematically shown in FIG. 7.

The method comprises carrying 450 a device for mitigating wind turbine vibrations 360 in a retracted configuration 370 to a wind turbine blade 22 using a drone 350.

The method further comprises sliding 460 the device around the wind turbine blade 22, using the drone 350.

The method further comprises extending 470 the device towards a blade root 210 using the drone 350. In some examples, extending the device towards the blade root may comprise pulling the device until it contacts a blade surface and stops, in particular until a tip end 320 of the device 360 cannot keep moving towards the blade root 210. Extending the device towards the blade root may further comprise breaking a breakable connector 365 keeping the device in the retracted configuration 370. The device may therefore be pulled further towards the blade root 210 and extended.

The method further comprises securing 480 the device to a nacelle or hub of the wind turbine. Securing the device may comprise bringing a carrying rope joining the drone and the device to a nacelle or hub using the drone.

The method may further comprise removing the device from the blade before the wind turbine starts or resumes operation. In some examples, the method may comprise detaching a carrying rope from a hub or nacelle, joining a drone to the carrying rope and carrying the device 360 away from the blade 22 using the drone.

In some examples, removing the device may comprise pulling and/or sliding the device towards a blade tip and carrying the device to a collection site, e.g. to a landing site.

This written description uses examples to disclose the teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for installing a first vibration mitigating device for mitigating wind turbine vibrations on a first wind turbine blade of a parked wind turbine, the method comprising:
    moving the first vibration mitigating device at least partially around the first wind turbine blade using one or more drones, the first vibration mitigating device separate from and attached to the one or more drones;
    securing the first vibration mitigating device to the wind turbine;
    releasing the secured first vibration mitigating device from the one or more drones;
    extending the first vibration mitigating device from a retracted configuration to an extended configuration; and
    wherein the first vibration mitigating device is maintained in the retracted configuration by a breakable connector.

2. The method of claim 1, wherein moving the first vibration mitigating device further comprises moving the first vibration mitigating device from a blade tip towards a blade root.

3. The method of claim 1, comprising extending the first vibration mitigating device until an end of the first vibration mitigating device configured to be closer to the blade tip gets stuck around the blade.

4. A method for installing a first vibration mitigating device for mitigating wind turbine vibrations on a first wind turbine blade of a parked wind turbine, the method comprising:

moving the first vibration mitigating device at least partially around the first wind turbine blade using one or more drones;
securing the first vibration mitigating device to the wind turbine;
wherein moving the first vibration mitigating device further comprises moving the first vibration mitigating device from a blade tip towards a blade root;
extending the first vibration mitigating device from a retracted configuration to an extended configuration; and
wherein the first vibration mitigating device is maintained in the retracted configuration by a breakable connector.

5. The method of claim 4, wherein extending the first vibration mitigating device comprises breaking the breakable connector by pulling the device towards the blade root with a force exceeding a predetermined force threshold.

6. The method of claim 5, wherein extending the first vibration mitigating device comprises continuing to move the vibration mitigating device towards the blade root until fully extending the first vibration mitigating device.

7. The method of claim 1, wherein the first vibration mitigating device is attached to the one or more drones by a carrying rope.

8. The method of claim 7, wherein the carrying rope is attached at or near a root end of the first vibration mitigating device, the root end configured to be closer to the blade root when mounted around the wind turbine blade.

9. The method of claim 7, wherein securing the first vibration mitigating device comprises carrying the carrying rope to a nacelle or a hub of the wind turbine.

10. The method of claim 9, wherein carrying the carrying rope to the nacelle or the hub further comprises pulling the carrying rope with a force exceeding a predetermined force threshold to extend the carrying rope.

11. The method of claim 10, wherein extending the carrying rope comprises unwinding the carrying rope from a winch.

12. The method of claim 10, wherein extending the carrying rope comprises tearing attached portions of the carrying rope.

13. The method of claim 1, further comprising arranging the first vibration mitigating device around the wind turbine blade tip.

14. The method of claim 1, further comprising carrying the first vibration mitigating device to the wind turbine blade using the one or more drones.

15. The method of claim 14, further comprising lifting the first vibration mitigating device from a hub, a nacelle, or a ground level.

16. The method of claim 1, further comprising installing a second vibration mitigating device for mitigating wind turbine vibrations on a second wind turbine blade using one or more additional drones, wherein a first time period for installing the first vibration mitigating device at least partially overlaps with a second time period for installing the second vibration mitigating device.

17. The method of claim 1, wherein the first vibration mitigating device comprises an air channel extending from a root end configured to be closer to a blade root to a tip end configured to be closer to a blade tip when the first vibration mitigating device is arranged around the wind turbine blade.

18. The method of claim 1, further comprising removing the first vibration securing device from the first wind turbine blade by:
bringing a drone that is separate from the first vibration mitigating device to a position relative to the first wind turbine blade and attaching the first vibration mitigating device to one or more drones;
carrying the first vibration mitigating device away from the first wind turbine blade using one or more drones; and
carrying the vibration mitigating device to a site using the one or more drones.

19. The method of claim 18, wherein the one or more drones are attached to the first vibration mitigating device via one or more carrying ropes.

20. The method of claim 19, further comprising detaching the carrying ropes from a nacelle or a hub.

21. The method of claim 18, further comprising pulling the first vibration mitigating device towards a blade tip prior to removing the first vibration mitigating device from the first wind turbine blade.

22. The method of claim 18, further comprising reducing a length of a carrying rope extending between the one or more drones and the first vibration mitigating device before carrying the vibration mitigating device to a site.

23. The method of claim 22, wherein the length of the carrying rope is reduced before pulling the first vibration mitigating device away from the first wind turbine blade.

24. The method of claim 18, further comprising removing a second vibration mitigating device from a second wind turbine blade using one or more additional drones, wherein a first time period for removing the first vibration mitigating device at least partially overlaps with a second time period for removing the second vibration mitigating device.

25. A method for mitigating vibrations of a parked wind turbine, the method comprising:
carrying a device for mitigating wind turbine vibrations in a retracted configuration to a wind turbine blade using a drone, the device separate from and attached to the drone;
the first vibration mitigating device maintained in the retracted configuration by a breakable connector;
sliding the device around the wind turbine blade tip using the drone;
breaking the breaking connector and extending the device towards a blade root using the drone;
securing the extended device to a nacelle or hub of the wind turbine; and
releasing the secured extended device from the drone so that the extended device subsequently functions to mitigate the vibrations.

26. The method of claim 25, wherein extending the device towards the blade root comprises pulling the device until the device engages a blade surface and stops.

27. The method of claim 25, wherein securing the device comprises bringing a carrying rope joining the drone and the device to the nacelle or the hub using the drone and securing the carrying rope to the nacelle or the hub prior and to releasing the carrying rope from the drone.

28. The method of claim 25, further comprising removing the device from the wind turbine blade before the wind turbine starts or resumes operation.

29. The method of claim 28, further comprising detaching a carrying rope from the hub or the nacelle, joining the drone to the carrying rope, and carrying the device away from the blade with the drone.

30. The method of claim 29, wherein carrying the device comprises sliding the device towards a blade tip and carrying the device to a collection site.

* * * * *